(12) United States Patent
Chen

(10) Patent No.: US 8,403,728 B2
(45) Date of Patent: Mar. 26, 2013

(54) COARSE AND FINE GRINDING/POLISHING MACHINE

(76) Inventor: Feng-Tien Chen, Taichung (TW)

(*) Notice: Subject to any disclaimer, the term of this patent is extended or adjusted under 35 U.S.C. 154(b) by 286 days.

(21) Appl. No.: 12/790,311

(22) Filed: May 28, 2010

(65) Prior Publication Data

US 2011/0217908 A1 Sep. 8, 2011

(30) Foreign Application Priority Data

Mar. 2, 2010 (TW) .............................. 99203704 U

(51) Int. Cl.
 *B24B 19/00* (2006.01)
 *B24B 7/02* (2006.01)
(52) U.S. Cl. ......... 451/150; 451/151; 451/152; 451/195
(58) Field of Classification Search .................. 451/1, 5, 451/6, 10, 11, 24, 65, 66, 150–152, 160, 451/259, 362, 463; *B24B 7/02, 19/00*
 See application file for complete search history.

(56) References Cited

U.S. PATENT DOCUMENTS

| | | | | |
|---|---|---|---|---|
| 810,908 A * | 1/1906 | Blechsmidt | .................. | 126/44 |
| 1,992,452 A * | 2/1935 | Troendly | ...................... | 451/269 |
| 2,320,672 A * | 6/1943 | Stein | .............................. | 451/138 |
| 2,374,928 A * | 5/1945 | Frauenthal et al. | ............ | 451/160 |
| 3,774,346 A * | 11/1973 | Hoglund | ........................ | 451/211 |
| 4,136,489 A * | 1/1979 | von Allmen | ................... | 451/231 |
| 4,584,794 A * | 4/1986 | Hirohata | ........................ | 451/160 |
| 4,845,900 A * | 7/1989 | Suzuki et al. | ..................... | 451/5 |
| 5,951,376 A * | 9/1999 | Mandler | ......................... | 451/43 |
| 6,095,897 A * | 8/2000 | Stocker et al. | .................... | 451/5 |
| 7,416,473 B2 * | 8/2008 | Belli et al. | ......................... | 451/5 |
| 2007/0264912 A1 * | 11/2007 | Kajiyama et al. | ............... | 451/41 |

FOREIGN PATENT DOCUMENTS

| | | | | |
|---|---|---|---|---|
| DE | 3711895 | A | * | 10/1988 |
| DE | 10225719 | A1 | * | 1/2004 |
| JP | 59205247 | A | * | 11/1984 |
| JP | 63062650 | A | * | 3/1988 |
| JP | 07328902 | A | * | 12/1995 |
| JP | S63-062650 | | | 3/1998 |

OTHER PUBLICATIONS

Machine translations provided by http://worldwide.espacenet.com.*
Office Action issued in corresponding Korean Patent Application No. 2010-66988 on Feb. 14, 2012.
English abstract of Japanese Laid-Open Publication No. S63-062650.

* cited by examiner

*Primary Examiner* — Lee D Wilson
*Assistant Examiner* — Tyrone V Hall, Jr.
(74) *Attorney, Agent, or Firm* — Hamilton, DeSanctis & Cha LLP

(57) ABSTRACT

A grinding/polishing machine includes first and second grinding units. The first grinding unit is mounted slidably on a column on a base support to move along a Z-axis direction, and has a first grinding wheel. The second grinding unit is mounted slidably on the first grinding unit to move along a Y-axis direction and has a second grinding wheel aligned with the first grinding wheel. When the second grinding wheel is in a grinding position, the second grinding wheel is situated between the first grinding wheel and a platform mounted on the base support to hold a workpiece. When the second grinding wheel moves away from the first grinding wheel, the first grinding wheel is movable to the platform for a grinding operation. The first and second grinding wheels have different levels of coarseness/fineness.

6 Claims, 7 Drawing Sheets

COARSE AND FINE GRINDING/POLISHING MACHINE

CROSS REFERENCE TO RELATED APPLICATION

This application claims priority of Taiwanese Application No. 099203704 filed on Mar. 2, 2010.

BACKGROUND OF THE INVENTION

1. Field of the Invention

The invention relates to a grinding/polishing machine, and more particularly to a grinding/polishing machine having two coarse and fine grinding units.

2. Description of the Related Art

Referring to FIG. 1, a conventional grinding/polishing machine 1 includes a base support 11, a platform 12 mounted on the machine body 11 and adapted for holding a workpiece 2, a column 13 engaging slidingly the base support 11 along a Y-axis direction, and a grinding unit 14 engaging slidingly the column 13 along a Z-axis direction. The grinding unit 14 has a grinding wheel 141 for grinding the workpiece 2. The grinding wheel 141 is movable relative to the workpiece 2 along the Y-axis direction together with the column 13 and along the Z-axis direction for grinding a surface 21 of the workpiece 2.

The fineness/coarseness of the surface 21 of the workpiece 2 is determined by the grain size of the material of the grinding wheel 141. Generally speaking, when a large amount of grinding is to be performed, a grinding wheel 141 with coarse grains is used to perform a coarse grinding operation. When the surface of the workpiece needs polishing, a grinding wheel 141 with finer grains is used to perform a fine grinding operation.

Since only one grinding wheel 141 can be mounted on the grinding/polishing machine 1, once the grinding wheel 141 is installed on the machine 1, only one mode of grinding operation can be performed. When it is necessary to switch the mode of grinding operation, the existing grinding wheel has to be disassembled from the machine 1, and another grinding wheel has to be re-assembled as a replacement. The task of disassembling and re-assembling the grinding wheel is time consuming, troublesome, and uneconomical.

SUMMARY OF THE INVENTION

Therefore, the main object of the present invention is to provide a grinding/polishing machine that incorporates coarse and fine grinding wheels and that is provided with a high working efficiency.

According to the present invention, a grinding and polishing machine comprises: a machine body having a base support, a platform mounted on the base support adapted to hold a workpiece, and a column extending from the base support along a Z-axis direction; a first grinding unit having a first grinding wheel and mounted slidably on the column to move the first grinding wheel toward or away from the platform along the Z-axis direction; and a second grinding unit having a second grinding wheel, mounted on the first grinding unit for concomitant movement with the first grinding unit, and slidable relative to the first grinding unit to move the second grinding wheel along a Y-axis direction. The first and second grinding wheels have different levels of coarseness/fineness. The first and second grinding wheels have respective axes of rotation that extend in the Y-direction. The second grinding wheel is movable between a grinding position in which the second grinding wheel is situated between the first grinding wheel and the platform, and a non-grinding position in which the second grinding wheel moves away from the first grinding wheel and the platform.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
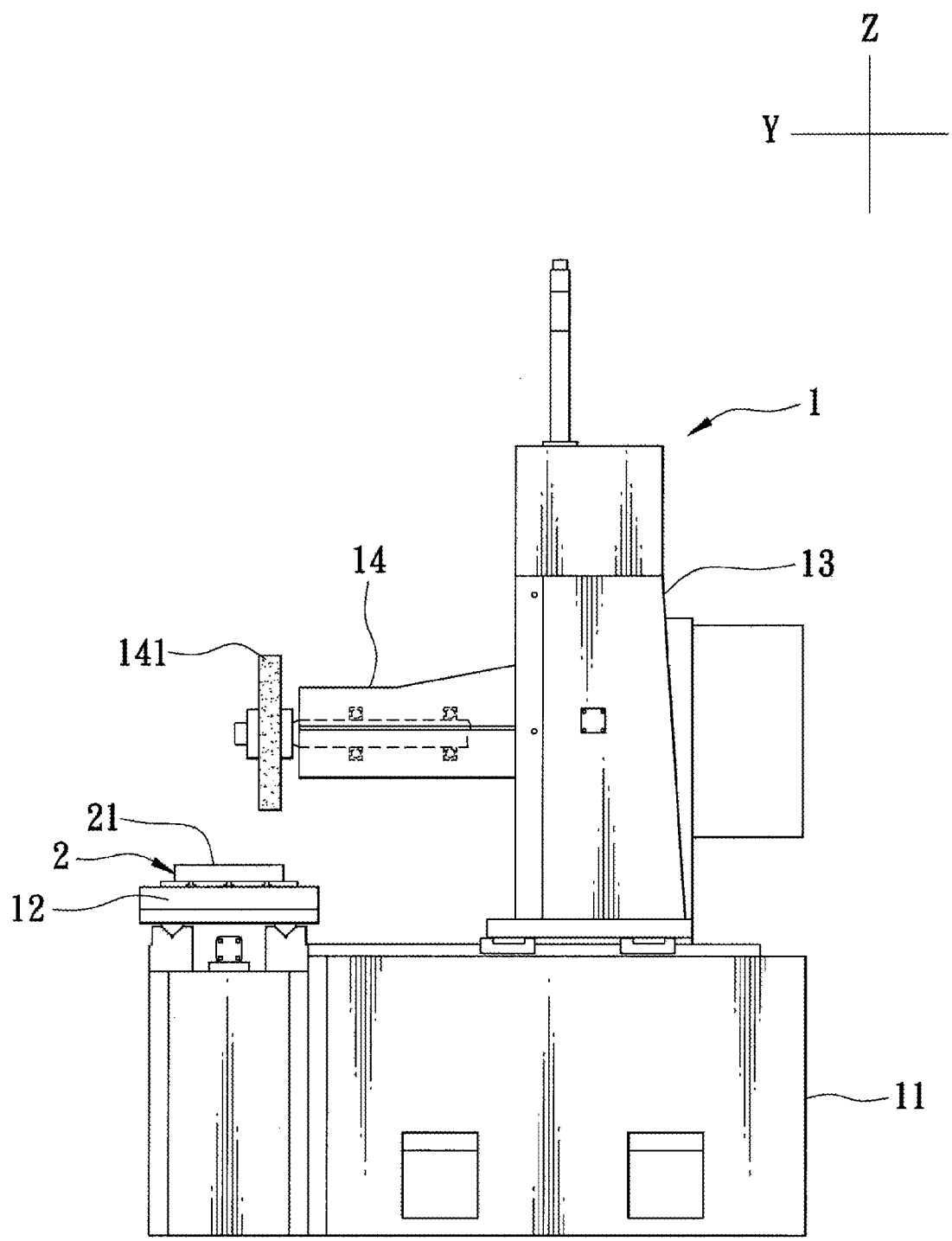
FIG. 1 is a side view of a conventional grinding machine.
Figure 2:
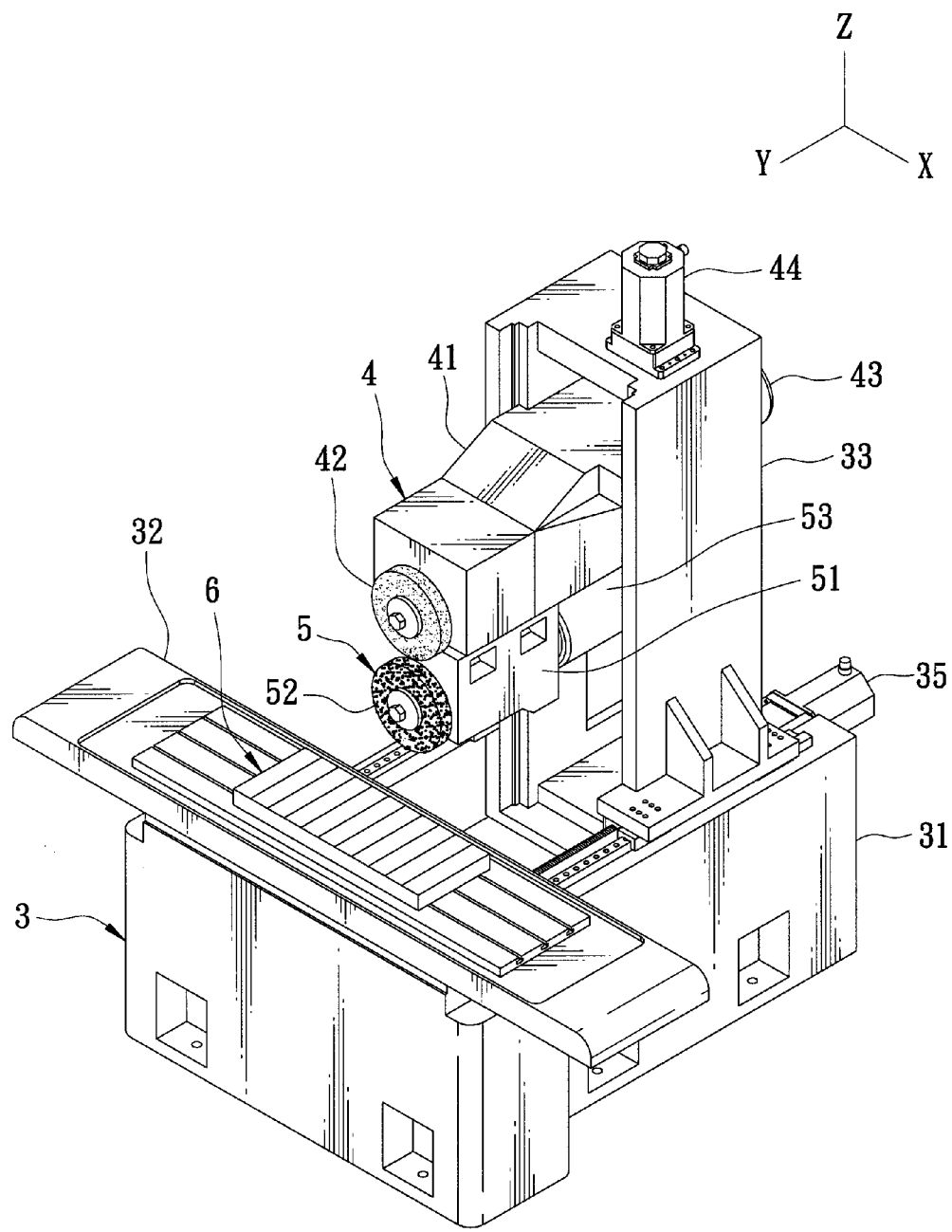
FIG. 2 is a perspective view of the preferred embodiment of a grinding/polishing machine according to the present invention.
Figure 3:
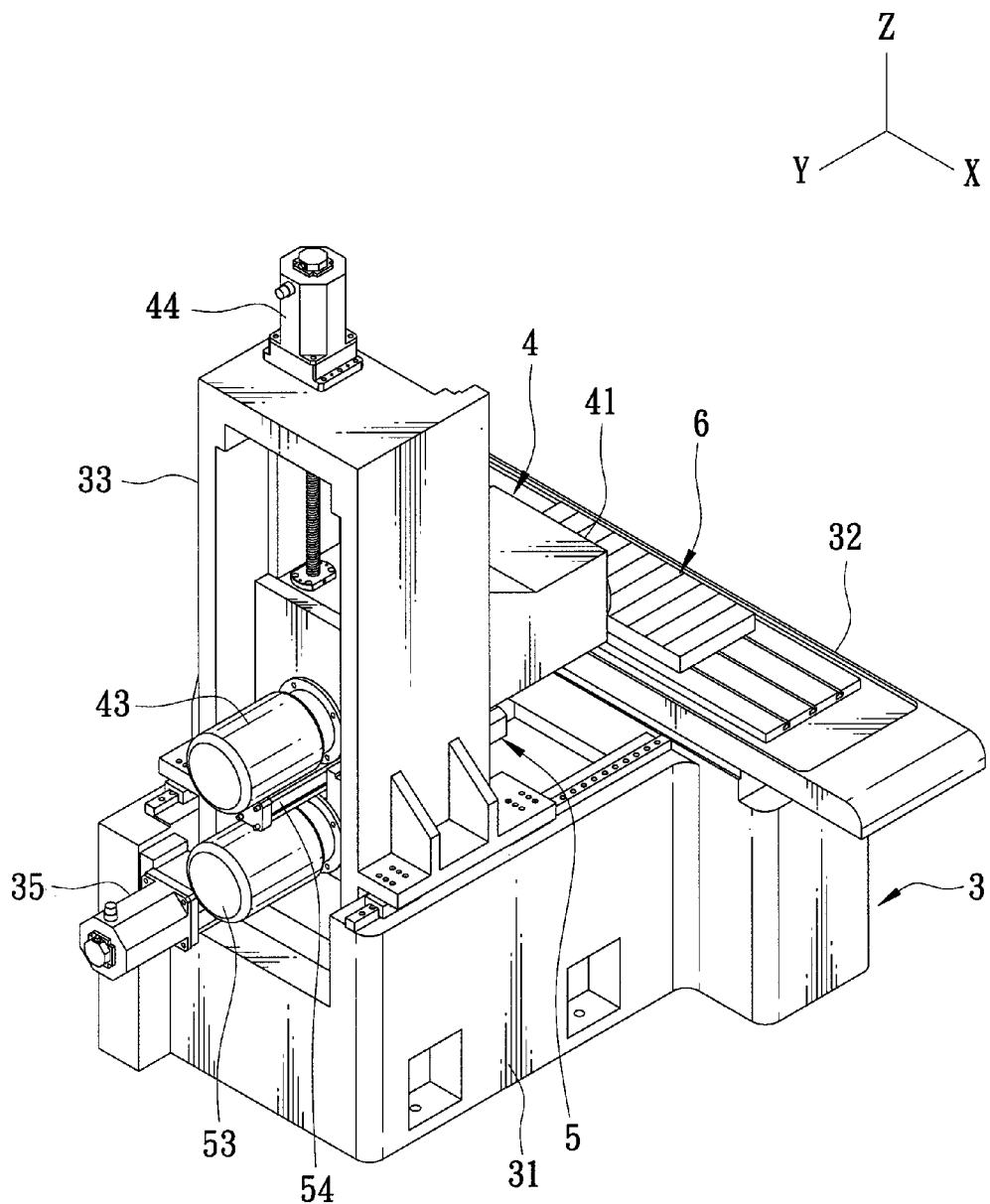
FIG. 3 is another perspective view of the preferred embodiment.

Referring to FIGS. 2 to 7, a grinding/polishing machine according to a preferred embodiment of the present invention is shown to include a machine body 3, a first grinding unit 4 and a second grinding unit 5.

The machine body 3 has a base support 31, a platform 32 mounted on the base support 31 for sliding along a X-axis direction and adapted to hold a workpiece 6, a column 33 engaging slidingly the base support 31 along a Y-axis direction and extending upwardly from the base support 31 in a Z-axis direction, an X-axis hydraulic drive unit 34 mounted on the base support 31 for driving the platform 32 to move along the X-axis direction, and a Y-axis servo motor 35 mounted on the base support 31 for driving the column 33 to move along the Y-axis direction.

The first grinding unit 4 has a first carriage 41 mounted slidably on the column 33 to move along the Z-axis direction, a first grinding wheel 42 mounted pivotally on one side of the first carriage 41, a first motor 43 mounted on the other side of the first carriage 41 to drive the first grinding wheel 42, and a Z-axis servo motor 44 mounted on the column 33 for driving the first carriage 41 to move along the Z-axis direction. The first carriage 41 has a bottom side provided with a pair of slide rails 411 extending in the Y-axis direction. The first grinding wheel 42 has a relatively small grain size and is used for fine grinding the workpiece 6.

The second grinding unit 5 has a second carriage 51, a second grinding wheel 52, a second motor 53 and a hydraulic drive unit 54. The second carriage 51 is mounted slidably on the slide rails 411 of the first grinding unit 4 to move along the Y-axis direction. The second grinding wheel 52 is mounted pivotally on one side of the second carriage 51 and has a grain size coarser than that of the first grinding wheel 42 so that it is used for coarse grinding. The second motor 53 is mounted on the other side of the second carriage 51 for driving the second grinding wheel 52. The hydraulic drive unit 54 has a cylinder 541 mounted on a bottom side of the first carriage 41, and a piston 542 connected slidably to the cylinder 541 to move along the Y-axis direction. The piston 542 is connected drivingly to the second carriage 51 to move the second carriage 51 relative to the first carriage 41.

Figure 4:
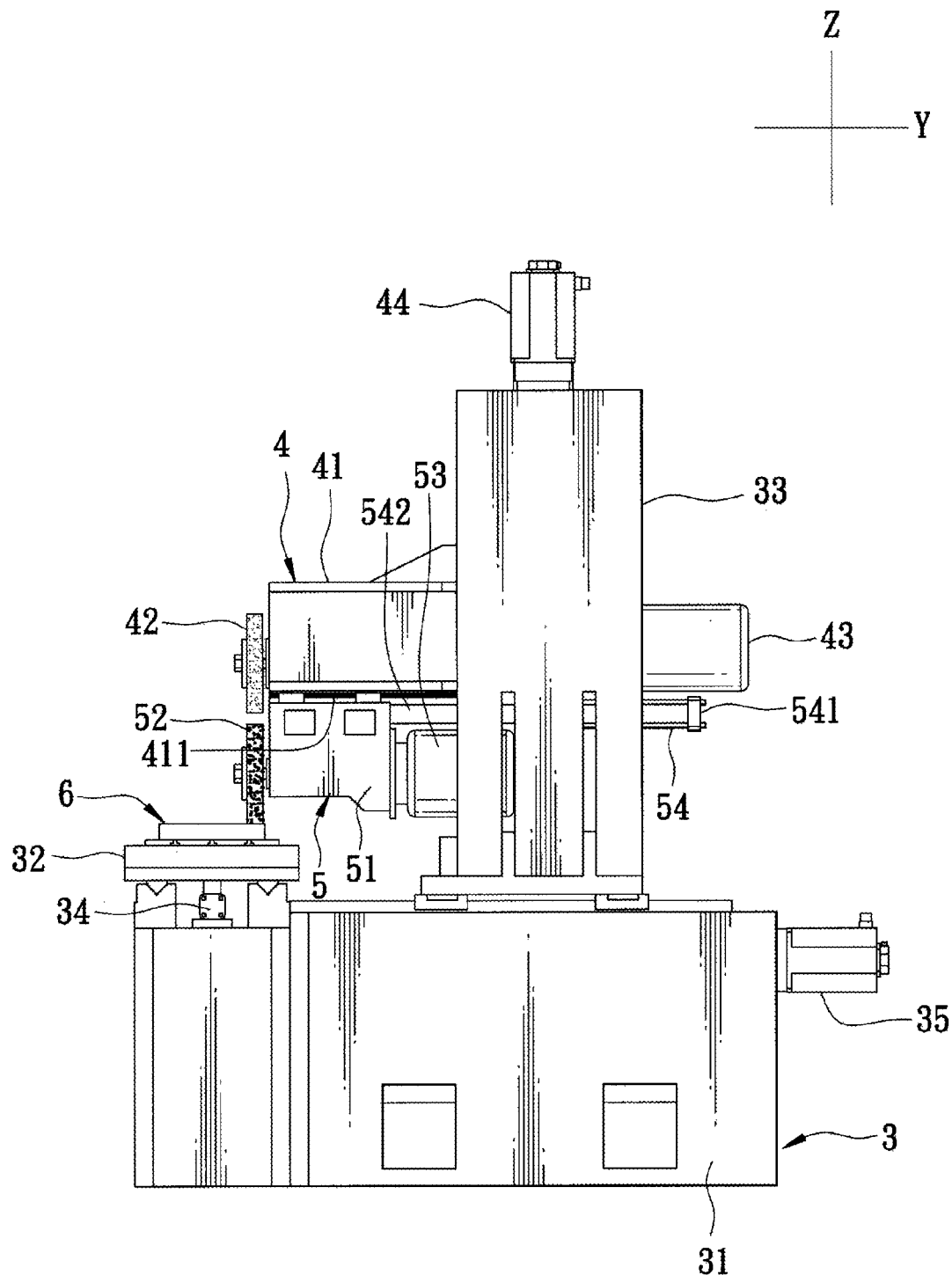
FIG. 4 is an elevation view of the preferred embodiment illustrating that a second grinding wheel is in its grinding position.
Figure 5:
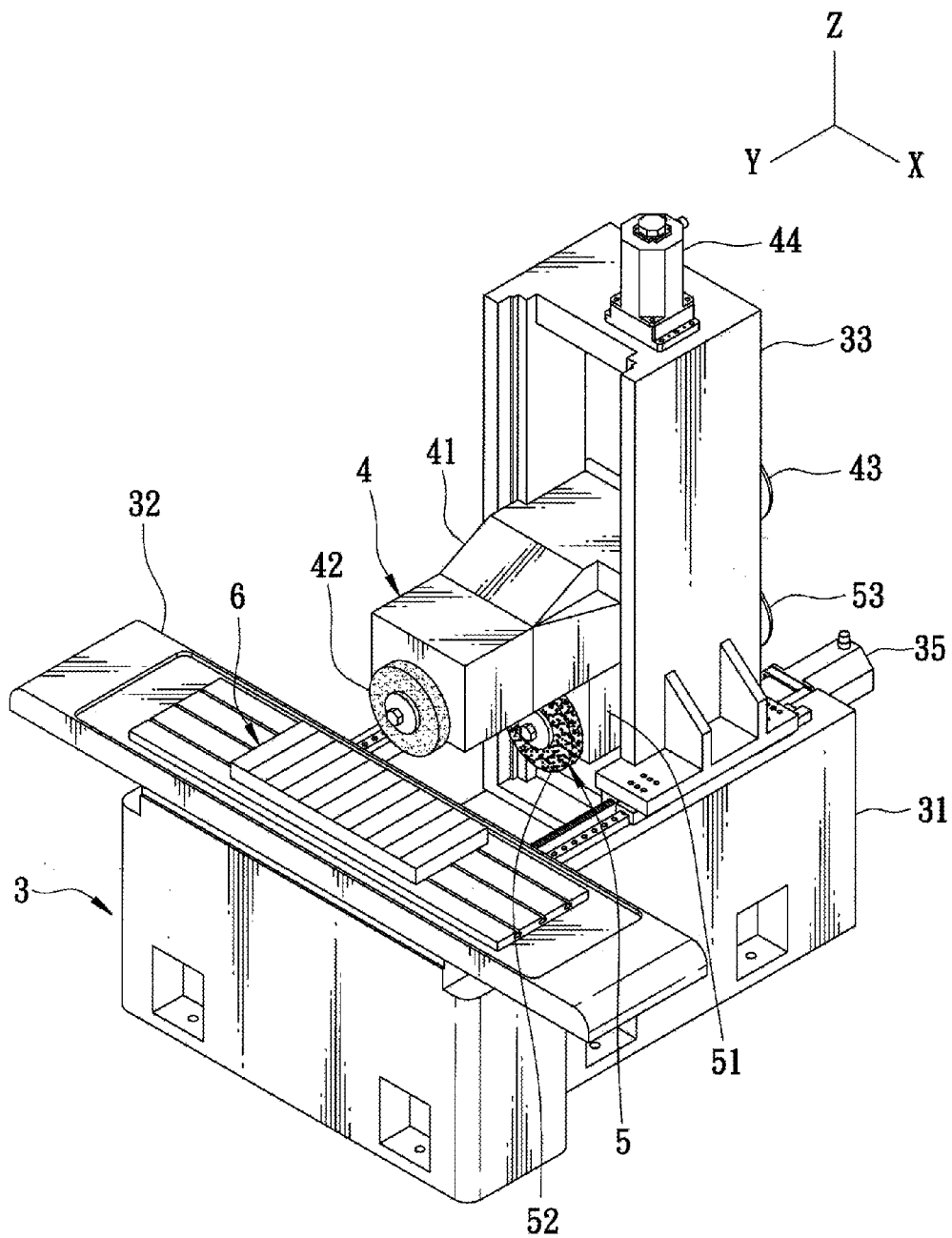
FIG. 5 is the same view as FIG. 2 but showing that a first grinding wheel is moved to the workpiece, and the second grinding wheel is in its standby position.
Figure 6:
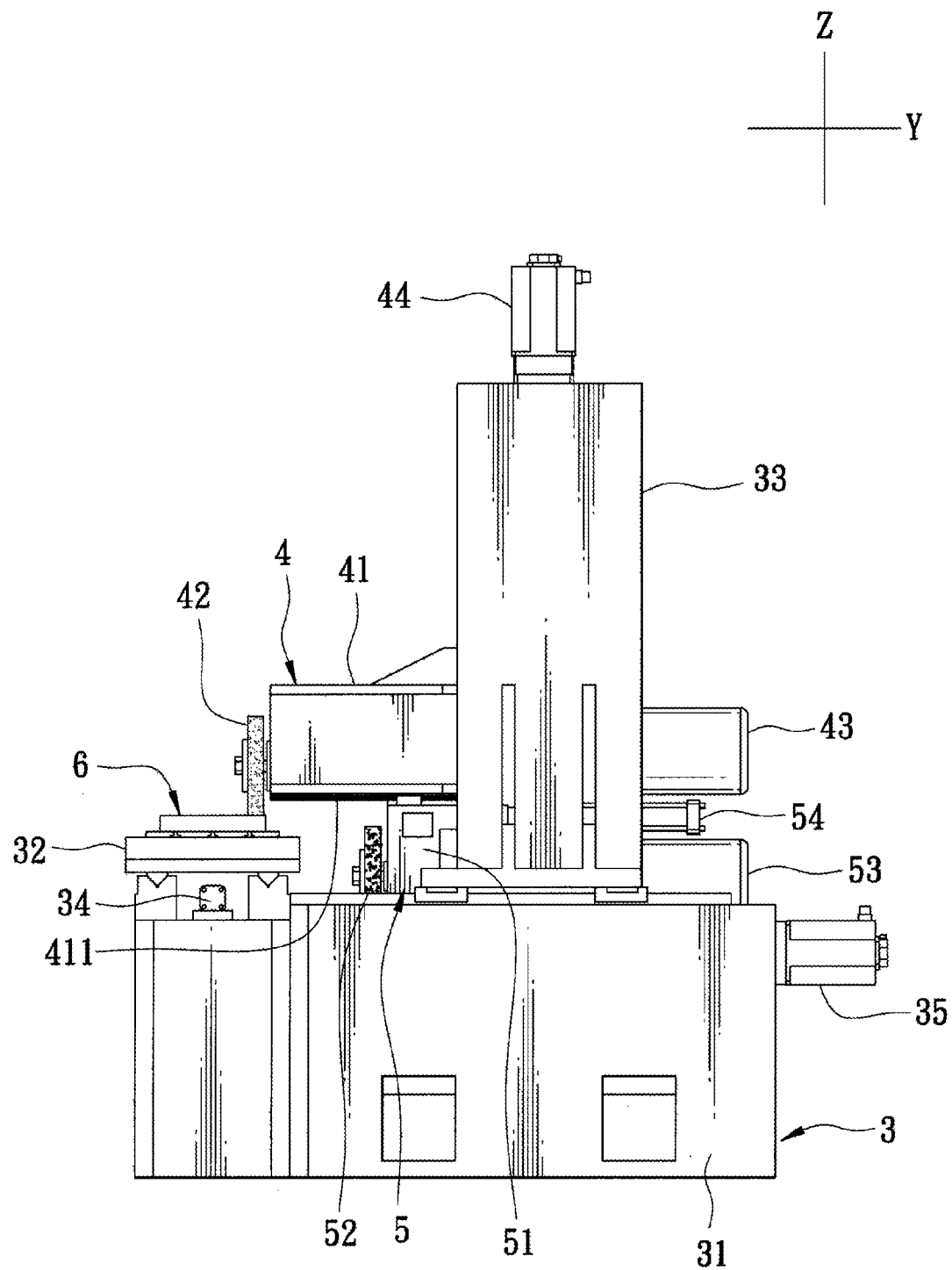
FIG. 6 is the same view as FIG. 4 but showing that the first grinding wheel is in its grinding position.

As best shown in FIGS. 4 and 6, the first and second grinding wheels 42, 52 have respective axes of rotation that extend in the Y-direction. The second grinding wheel 52 is movable between a grinding position (FIG. 4) in which the second grinding wheel 52 is situated between the first grinding wheel 42 and the platform 32, and a non-grinding position (FIG. 6) in which the second grinding wheel 52 moves away from the first grinding wheel 42 and the platform 32. The first grinding wheel 42 is movable to the platform 32 when the second grinding wheel 52 is in its non-grinding position.

Referring again to FIGS. 2 and 4, for a coarse grinding mode, the hydraulic drive unit 54 drives the second carriage 51 to move away from the column 33 and to move along the slide rail 411 in the Y-axis direction so that the second grinding wheel 52 is placed in the grinding position that is located away from the column or that is in proximity to the platform 32. Accordingly, the second grinding wheel 52 is directly beneath the first grinding wheel 42. Therefore, when the Y-axis servo motor 35, and the Z-axis servo motor 44 respectively drive the column 33 along the Y-axis and the first grinding unit 4 along the Z-axis, the second grinding wheel 52 is placed in contact with the workpiece 6 for coarse grinding the surface of the workpiece 6. A rapid grinding rate can be achieved by the coarse grinding.

Referring again to FIGS. 5 and 6, the grinding/polishing grinding machine is illustrated in a fine grinding mode. The hydraulic drive unit 54 is operated to drive directly the second carriage 51 to move toward the column 33 along the slide rail 411 so that the second grinding wheel 52 is moved away from the workpiece 6 and the first grinding wheel 42. When the Z-axis servo motor 44 drives the first carriage 41 toward the workpiece 6, the first grinding wheel 42 contacts the workpiece 6 and performs the fine grinding operation.

Figure 7:
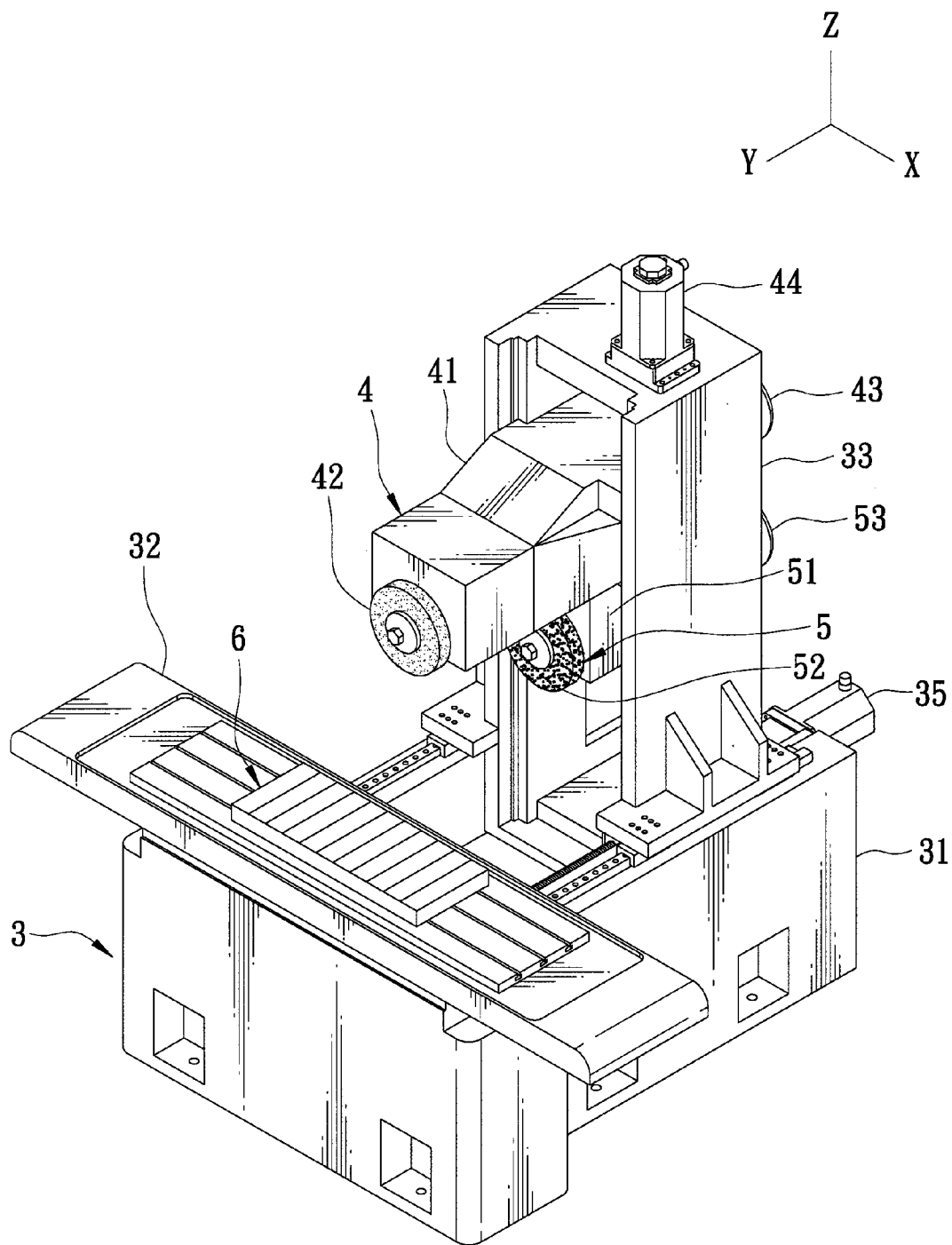
FIG. 7 is the same view as FIG. 2 but showing that the second grinding wheel is moved away from the workpiece.

Referring to FIG. 7, by operating the Z-axis motor 44, the first and second grinding units 4 and 5 can be moved together along the Z-axis direction, and can be moved readily upward or downward. Therefore, the first or second grinding wheel 42, 52 can be prevented from interfering with the workpiece 6.

By virtue of the present invention, the first and second grinding wheels 42, 52 are mountable on the same machine body 3 and can operate independently to perform respective coarse and fine grinding operations. Therefore, the grinding/polishing machine of the present invention can switch between coarse and fine grinding modes without requiring disassembling and reassembling operations to replace either the grinding wheel 42 or 52.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A grinding/polishing machine, comprising:
   a machine body having a base support, a platform mounted on said base support adapted to hold a workpiece, and a column extending from said base support along a Z-axis direction;
   a first grinding unit having a first grinding wheel, and a first carriage engaging slidably said column to move said first grinding wheel toward or away from said platform along said Z-axis direction, said first carriage having a bottom side provided with a slide rail extending in a Y-axis direction; and
   a second grinding unit having a second grinding wheel, and a second carriage engaging slidably said slide rail for concomitant movement with said first grinding unit, such that said second carriage is slidable relative to said first carriage to move said second grinding wheel along said Y-axis direction;
   said first and second grinding wheels having different levels of coarseness/fineness;
   said first and second grinding wheels having respective axes of rotation that extend in said Y-direction;
   said second grinding wheel being movable between a grinding position in which said second grinding wheel is situated between said first grinding wheel and said platform, and a non-grinding position in which said second grinding wheel moves away from said first grinding wheel and said platform.

2. The grinding/polishing machine of claim 1, wherein said first grinding wheel is movable to said platform when said second grinding wheel is in said non-grinding position.

3. The grinding/polishing machine of claim 1, wherein said column is mounted slidably on said base support to move along said Y-axis direction.

4. The grinding/polishing machine of claim 1, wherein said first grinding unit further has a first motor mounted on one side of said first carriage to drive said first grinding wheel, said first grinding wheel being mounted on the other side of said first carriage.

5. The grinding/polishing machine of claim 1, wherein said second grinding unit further has a second motor mounted on one side of said second carriage to drive said second grinding wheel, said second grinding wheel being mounted on the other side of said second carriage.

6. The grinding/polishing machine of claim 1, further comprising a hydraulic drive unit connected to said first and second carriages to move said second carriage relative to said first carriage and along said Y-axis direction.

\* \* \* \* \*